United States Patent
Ryu et al.

(10) Patent No.: US 7,517,612 B2
(45) Date of Patent: Apr. 14, 2009

(54) ORGANIC ELECTROLYTIC SOLUTION AND LITHIUM-SULFUR BATTERY COMPRISING THE SAME

(75) Inventors: Young-Gyoon Ryu, Gyeonggi-do (KR); Myung-Dong Cho, Hwaseong-si (KR); Sang-Mock Lee, Gyeonggi-do (KR); Boris A. Trofimov, Irkutsk (RU)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 927 days.

(21) Appl. No.: 10/927,182

(22) Filed: Aug. 27, 2004

(65) Prior Publication Data
US 2005/0053839 A1    Mar. 10, 2005

(30) Foreign Application Priority Data
Sep. 5, 2003    (KR)    ............ 10-2003-0062172

(51) Int. Cl.
  H01M 10/36    (2006.01)
  H01M 10/40    (2006.01)
  H01M 6/16    (2006.01)
  H01M 4/02    (2006.01)
  H01M 4/36    (2006.01)
  H01M 4/38    (2006.01)
  H01M 4/40    (2006.01)

(52) U.S. Cl. .............. 429/188; 429/122; 429/324; 429/231.95; 429/336; 429/337; 429/339; 429/340; 429/341; 429/342; 252/62.2

(58) Field of Classification Search ............... None
See application file for complete search history.

(56) References Cited

U.S. PATENT DOCUMENTS

| 4,643,958 | A | 2/1987 | Thrash |
| 5,523,179 | A | 6/1996 | Chu |
| 5,814,420 | A | 9/1998 | Chu |
| 5,961,672 | A | 10/1999 | Skotheim et al. |
| 6,030,720 | A | 2/2000 | Chu et al. |
| 6,569,573 | B1 * | 5/2003 | Mikhaylik et al. ......... 429/324 |

FOREIGN PATENT DOCUMENTS

| CN | 1339846 | 3/2002 |
| JP | 10-021920 | 1/1998 |
| JP | 2002-280065 | 9/2002 |
| KR | 10-2003-0031396 | 4/2003 |

OTHER PUBLICATIONS (Academic press Dictionary of Science and Technology), 1992, [online], [retrieved on May 22, 2008], Retrieved from Credo Reference (Xreferplus) using internet <http://www.credoreference.com/entry/3140907>.*

Registration Determination Certificate from the Chinese Patent Office issued in Applicant's corresponding Chinese Patent Application No. ZL200410068750.9 dated Dec. 17, 2008.

* cited by examiner

*Primary Examiner*—Dah-Wei D Yuan
*Assistant Examiner*—Katherine Turner
(74) *Attorney, Agent, or Firm*—Robert E. Bushnell, Esq.

(57) ABSTRACT

An organic electrolytic solution for a lithium-sulfur battery that provides high discharge capacity and longer cycle life to the battery, and a lithium-sulfur battery including the organic electrolytic solution are provided. The electrolytic solution includes a lithium salt, an organic solvent, and further a compound represented by Formula (I):

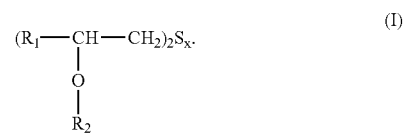

22 Claims, 3 Drawing Sheets

ORGANIC ELECTROLYTIC SOLUTION AND LITHIUM-SULFUR BATTERY COMPRISING THE SAME

CLAIM OF PRIORITY

This application claims all benefits accruing under 35 U.S.C. §119 from the Korean Patent Application No. 2003-62172 for ORGANIC ELECTROLYTE SOLUTION AND LITHIUM SULFUR BATTERY COMPRISING THE SAME, filed on Sep. 5, 2003, in the Korean Intellectual Property Office, the disclosure of which is incorporated herein in its entirety by reference.

BACKGROUND OF THE INVENTION

1. Field of the Invention

The present invention relates to an organic electrolytic solution and a lithium-sulfur battery comprising the same, and more particularly, to an organic electrolytic solution comprising a compound that can improve discharge capacity and cycle life of a lithium-sulfur battery, and a lithium-sulfur battery comprising the same.

2. Description of the Related Art

Demands for secondary batteries are increased according to rapid progress in portable electronic devices, and a battery having high energy density that can meet the present trend of light, thin, short and small dimensions in portable electronic devices is continuously required. A battery that can meet cheap, safe and environment-affinitive aspect is required to meet such need.

The lithium-sulfur battery of various batteries to meet such need is most promising in energy density among the batteries that have ever been developed. The energy density of lithium is 3830 mAh/g, and the energy density of sulfur ($S_8$) is 1675 mAh/g. An active material used therein is cheap itself and environment-affinitive; however, such battery system has not been commercialized yet.

The reason why the lithium-sulfur battery cannot be commercialized is that the ratio of the amount of sulfur participating in electrochemical oxidation-reduction reaction within the battery to the amount of sulfur contained within the battery is so low that the battery shows low battery capacity.

For the lithium-sulfur battery, elemental sulfur is used as an initial anode active material. As the discharge of battery proceeds, eight sulfur atoms in cyclic molecular state are changed to linear molecular state while being reduced, and finally changed to $S^{2-}$ by continued reduction. The resulting $S^{2-}$ bonds chemically to surrounding lithium cations to form lithium sulfide ($Li_2S$). Since the resulting lithium sulfide precipitates on an anode surface to reduce the activated area of the battery, and it cannot be oxidized during charging, the battery capacity is decreased. Accordingly, it is necessary to dissociate such lithium sulfide to maintain the activated area of the battery.

Approaches to solve such problems have been tried as follows.

U.S. Pat. No. 6,030,720 uses the solvent including $R_1(CH_2CH_2O)_nR_2$ as a main solvent, in which n is 2 to 10, $R_1$ and $R_2$ are the same or different from each other, and represent a substituted or unsubstituted alkyl or alkoxy group, and a crown ether or a crypt and as a cosolvent. A donor or an acceptor cosolvent is included wherein the donor solvent has a donor number of at least 15. The separation distance of the battery must be 400 μm or less.

In general, when a lithium-sulfur battery is discharged, the formation and precipitation of $Li_2S$ on the surface of electrodes are known as a major cause of a drop in battery capacity. Many researches have been conducted to increase the capacity of the lithium-sulfur battery. In most cases, ether-based solvents capable of stabilizing the lithium-sulfides are used, and an initial discharge capacity of the lithium-sulfur battery is about 840 mAh/g-sulfur, which is about 50% of the theoretical capacity. The polar solvents such as DMF, DMAc, etc. were tried to dissociate $Li_2S$, but the polar solvents vigorously react with lithium, and thus cannot be applied to the lithium-sulfur battery system.

Also, U.S. Pat. No. 5,961,672 suggests a mixed solution of 1M $LiSO_3CF_3$ and 1,3-dioxolane/diglyme/sulfolane/dimethoxyethane (50/20/10/20) as an electrolytic solution to improve lifetime and stability of a battery by coating a polymer film on a lithium metal anode.

U.S. Pat. No. 5,814,420 contacts the electrode containing active materials with both an ion conducting material and an electron conducting material such that the active material such as activated sulfur and/or polysulfide polymer can be almost completely used.

U.S. Pat. No. 5,523,179 discloses a lithium-sulfur battery comprising an active sulfur-based material, an ion conducting material and an electron conducting material in an anode.

SUMMARY OF THE INVENTION

It is therefore an object of the present invention to provide an improved organic electrolytic solution.

It is another object of the present invention to provide an improved lithium-sulfur battery.

It is also an object of the present invention to provide an organic electrolytic solution that can improve discharge capacity and cycle life of the battery.

It is further an object of the present invention to provide a lithium-sulfur battery having improved discharge capacity and cycle life.

It is still further an object of the present invention to provide an electrolytic solution for a lithium-sulfur battery that contains an additive continuously dissociating lithium polysulfide for electrochemical reaction, thereby improving discharge capacity and cycle lifetime of the battery, and a lithium sulfur battery containing the electrolytic solution.

According to an aspect of the present invention, there is provided an electrolytic solution for a lithium-sulfur battery comprising a lithium salt and an organic solvent, wherein the solution further comprises a compound represented by Formula (I) below:

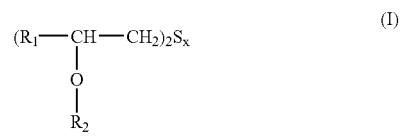

wherein $R_1$ represents any one selected from the group consisting of a hydrogen atom, a substituted or unsubstituted C1-C30 alkyl group, a substituted or unsubstituted C1-C30 alkoxy group, a substituted or unsubstituted C6-C30 aryl group, and a substituted or unsubstituted C8-C30 aralkenyl group;

$R_2$ represents a group of Formula (II) or (III) below; and

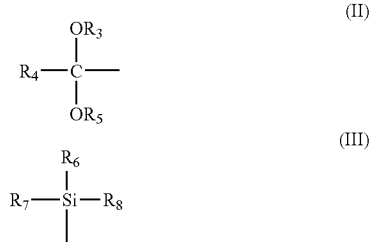

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group; and X is an integer of 2 to 5.

According to another aspect of the present invention, there is provided a lithium-sulfur secondary battery comprising: an anode comprising at least one anode active material selected from the group consisting of elemental sulfur, a sulfur-based compound and mixtures thereof; a cathode comprising at least one cathode active material selected from among a lithium metal, a lithium alloy, and a composite of lithium/inert sulfur; a separator interposed between the cathode and the anode to separate from each other; and an organic electrolytic solution comprising a lithium salt, an organic solvent and a compound represented by Formula (I) below:

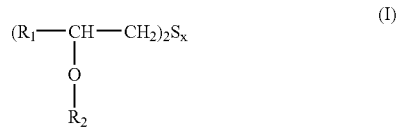

wherein $R_1$ represents any one selected from the group consisting of a hydrogen atom, a substituted or unsubstituted C1-C30 alkyl group, a substituted or unsubstituted C1-C30 alkoxy group, a substituted or unsubstituted $C_6$-$C_{30}$ aryl group, and a substituted or unsubstituted C8-C30 aralkenyl group;

$R_2$ represents a group of Formula (II) or (III) below;

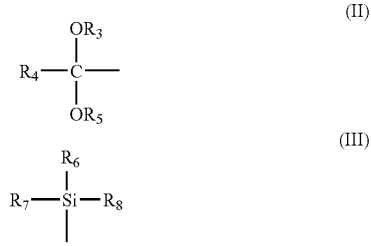

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group; and X is an integer of 2 to 5.

The organic electrolytic solution and the lithium-sulfur battery comprising the same according to the present invention provide improved discharge capacity and cycle life of the battery by preventing from binding a lithium metal with a sulfide such that the sulfur can participate continuously in an electrochemical reaction.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
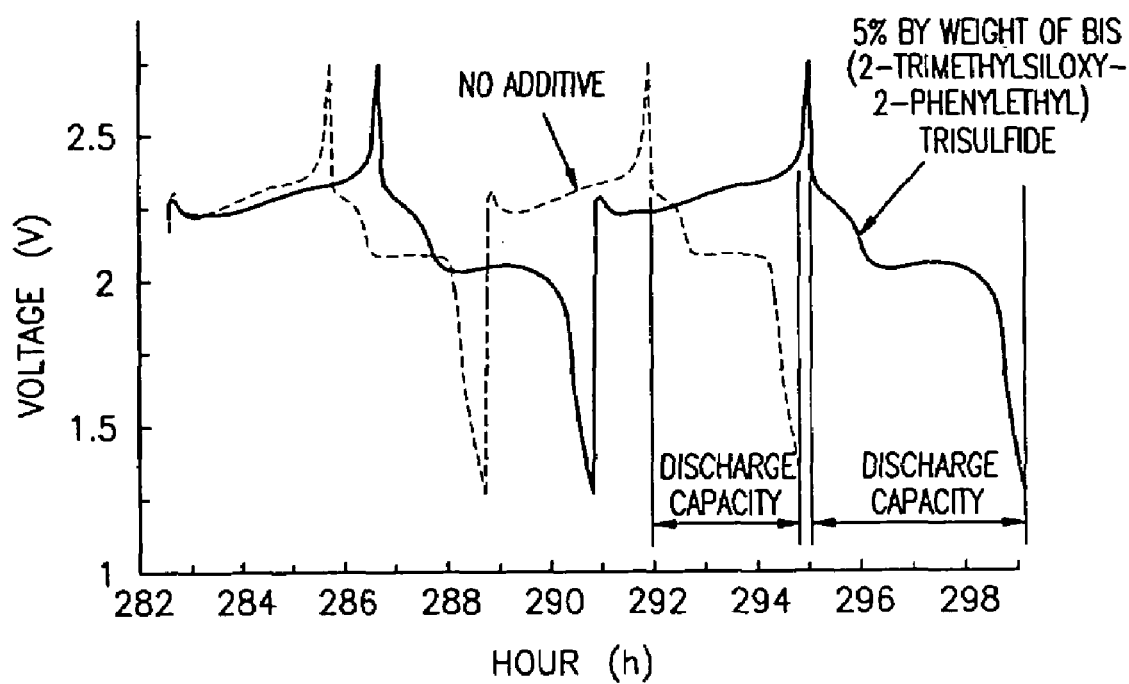
FIG. 1 is a charge-discharge curve of the lithium-sulfur batteries according to Examples and Comparative Examples.

The present invention provides an organic electrolytic solution and a lithium-sulfur battery comprising the same.

The term "aralkenyl group" herein refers to an alkenyl group in which a hydrogen atom in its double bond is substituted with an aryl group, of which the hydrogen atom can be substituted with any substituent.

According to an embodiment of the present invention, there is provided an electrolytic solution for lithium-sulfur battery comprising a lithium salt and an organic solvent, characterized in that the solution further comprises a compound represented by Formula I below:

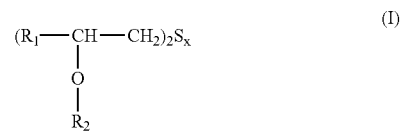

wherein $R_1$ represents any one selected from the group consisting of a hydrogen atom, a substituted or unsubstituted C1-C30, preferably C1-C12, and more preferably C1-C6 alkyl group; a substituted or unsubstituted C6-C30, preferably C6-C18, and more preferably C6-C12 aryl group; a substituted or unsubstituted C1-C30, preferably C1-C12, and more preferably C1-C6 alkoxy group; and a substituted or unsubstituted C8-C30, preferably C8-C18, and more preferably C8-C12 aralkenyl group.

$R_2$ represents a group of Formula II or III below;

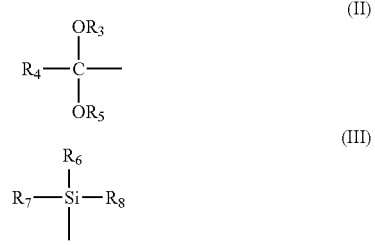

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group; and X is an integer of 2 to 5.

Preferably, 0.1 to 20% by weight of the compound of Formula (I) can be included in the organic electrolytic solution. Less than 0.1% by weight of the compound cannot dissociate sufficiently high level of polysulfides, and more than 20% by weight of the compound can cause seriously its own degradation reaction. More preferably, 0.1 to 10% by weight, most preferably, 0.5 to 5% by weight of the compound can be included in the organic electrolytic solution.

The compound of Formula (I) is preferably bis(2-trimethylsiloxy-2-phenylethyl) trisulfide.

Since Formula (I) has both an accept center for sulfide anions and an accept center for lithium ions, the electrolytic solution including the compound of Formula (I) can suppress the production of lithium sulfides so that a reduction in battery capacity during a next discharge cycle, caused by oxidation during charging, can be suppressed.

The compound of Formula (I) according to the present invention bonds to and coordinates with $S^{2-}$ or $LiS^-$ in lithium sulfide, thereby suppressing the ions' bonding to lithium ion, and thus increases stability of the sulfide anion.

Referring to representative bis(2-trimethylsiloxy-2-phenylethyl) trisulfide among the compounds represented by Formula I, an oxygen atom having relatively many electrons traps lithium ions and a silicon atom having relatively a few electrons traps sulfide anions, and thus the bonding of sulfide anions with lithium ions is suppressed.

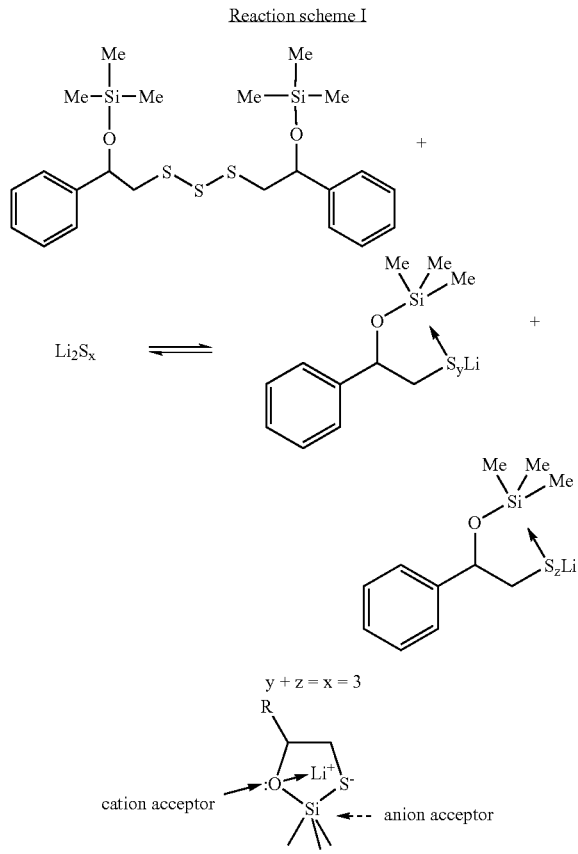

Hereinafter, the lithium-sulfur battery according to the present invention is described.

The lithium-sulfur battery according to the present invention comprises: an anode comprising at least one anode active material selected from the group consisting of elemental sulfur, a sulfur-based compound and mixtures thereof; a cathode comprising at least one cathode active material selected from among a lithium metal, a lithium alloy, and a composite of lithium/inert sulfur; a separator interposed between the cathode and the anode to separate from each other; and an organic electrolytic solution comprising a lithium salt, an organic solvent and a compound represented by Formula (I).

The cathode active material can be a lithium metal, a lithium alloy, or a composite of lithium metal/inert sulfur, and the anode active material can be at least one active material selected from the group consisting of elemental sulfur, $Li_2S_n$ in which $n \geq 1$, a catholyte in which $Li_2S_n$ where $n \geq 1$ is dissolved, an organosulfur compound, and a carbon-sulfur polymer $((C_2S_x)_n)$ in which $x=2.5$ to $50$, and $n \geq 2$.

The lithium salt used in the electrolytic solution can be a salt selected from the group consisting of $LiPF_6$, $LiSO_3CF_3$, $LiN(SO_2CF_3)_2$, $LiClO_4$, $LiBF_4$, $LiAsF_6$, $LiC(CF_3SO_2)_3$, $LiN(C_2F_5SO_2)_2$, $LiN(CR_3SO_2)_2$ and a combination thereof.

The organic solvent used in the electrolytic solution according to the present invention can be any organic solvent used in conventional lithium-sulfur batteries. Examples thereof include at least one solvent selected from the group consisting of an oligoether-based compound such as tetrahydrofuran, 2-methyl tetrahydrofuran, 1,3-dioxolane, 4-methyl-1,3-dioxolane, etc., an ester carbonate-based compound such as dimethyl carbonate, diethyl carbonate, dipropyl carbonate, methylethyl carbonate, methylpropyl carbonate, etc., an alkyl ester-based compound such as methyl formate, methyl acetate, methyl propionate, etc., an aromatic nitrile-based compound, an amide-based compound, a lactone-based compound such as butyl lactone, and a sulfur-based compound. The solvent can be used alone or in combination of at least two solvents.

The electrolytic solution can further comprise an electron conducting material such that an electron can move smoothly in an anode plate. The electron conducting material can be, but is not limited to, a carbon black, a graphite, a carbon fiber, an electron conducting compound having a conjugated carbon-carbon double bond and/or a carbon-nitrogen double bond, for example, electron conducting polymer such as polyaniline, polythiophene, polyacetylene, polypyrrole, etc. and mixtures thereof.

The anode active material is attached to a current collector by a binder. The binder can be polyvinyl acetate, polyvinyl alcohol, polyethylene oxide, polyvinyl pyrrolidone, alkylated polyethylene oxide, crosslinked polyethylene oxide, polyvinyl ether, polymethyl methacrylate, polyvinylidene fluoride, copolymer of polyhexafluoropropylene and polyvinylidene fluoride, polyethyl acrylate, polytetrafluoroethylene, polyvinyl chloride, polyacrylonitrile, polyvinyl pyridine, polystyrene, and derivatives, mixtures or copolymers thereof.

The separator can be any one generally used in a lithium battery. A rollable separator such as polyethylene (PE), polypropylene (PP) film, etc. can be used, or a separator that is prepared by coating a gelated polymer on top of the PE or PP film, or infusing a composition comprising a polymerizable monomer for forming a gelated polymer into the battery, then polymerizing it to form the gelated polymer layer on PE or PP film can be used.

The lithium-sulfur battery using the organic electrolytic solution according to the present invention is manufactured as follows.

First, an anode active material composition is prepared by mixing an anode active material, a conducting material, a binder and a solvent. An anode plate is prepared by directly coating the anode active material composition on an aluminum current collector and drying the coated anode plate. Alternatively, an anode plate can be prepared by casting the anode active material composition on a separate support, and then laminating the film obtained by delaminating from the support, on the aluminum current collector. The support can be a polyester film such as a MYLAR™ film, etc.

A lithium metal plate, a sodium metal plate, a lithium alloy plate, or a sodium alloy plate, etc. is used as a cathode after cutting to a desired size. A current collecting plate composed of a conducting metal plate such as copper plate can be laminated on the cathode.

An electrode assembly is prepared by interposing a separator between the cathode plate and the anode plate. A lithium-sulfur battery is completed by winding or folding the electrode assembly and putting it in a cylindrical battery case or a prismatic type battery case, and then infusing the organic electrolytic solution according to the present invention thereto.

The present invention will be described in greater detail with reference to the following examples. The following examples are for illustrative purposes and are not intended to limit the scope of the invention.

EXAMPLES

Example 1

Figure 2:
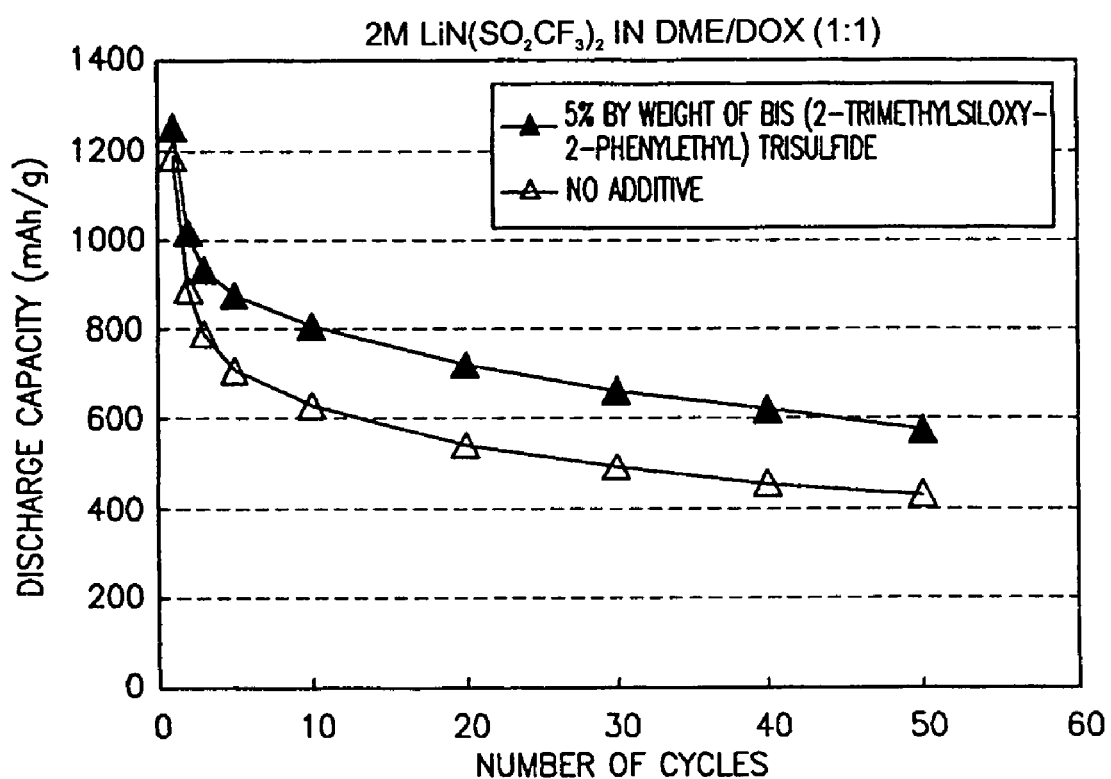
FIG. 2 is a graph illustrating the discharge capacity according to cycles for the lithium-sulfur batteries according to Examples and Comparative Examples.

Elemental sulfur (80% by weight), a polymer binder (styrenebutadiene rubber, 15% by weight) and a carbon black conducting material (5% by weight) were mixed and coated on an aluminum film, and the coated product was used as an anode. Lithium metal having a thickness of 150 microns was used as a cathode. 25 microns of a PE/PP/PE separator obtained from Asahi Company was used as a separator. The organic electrolytic solution contains 5% by weight of bis(2-trimethylsiloxy-2-phenylethyl) trisulfide and 2M LiN(SO$_2$CF$_3$)$_2$ in dimethoxyethane (DME)/dioxolane (DOX) (1:1 by volume). A battery was assembled from the cathode, the anode and the organic electrolyte, and a charge-discharge test was performed. The results are shown in FIGS. 1 and 2.

Example 2

Figure 3:
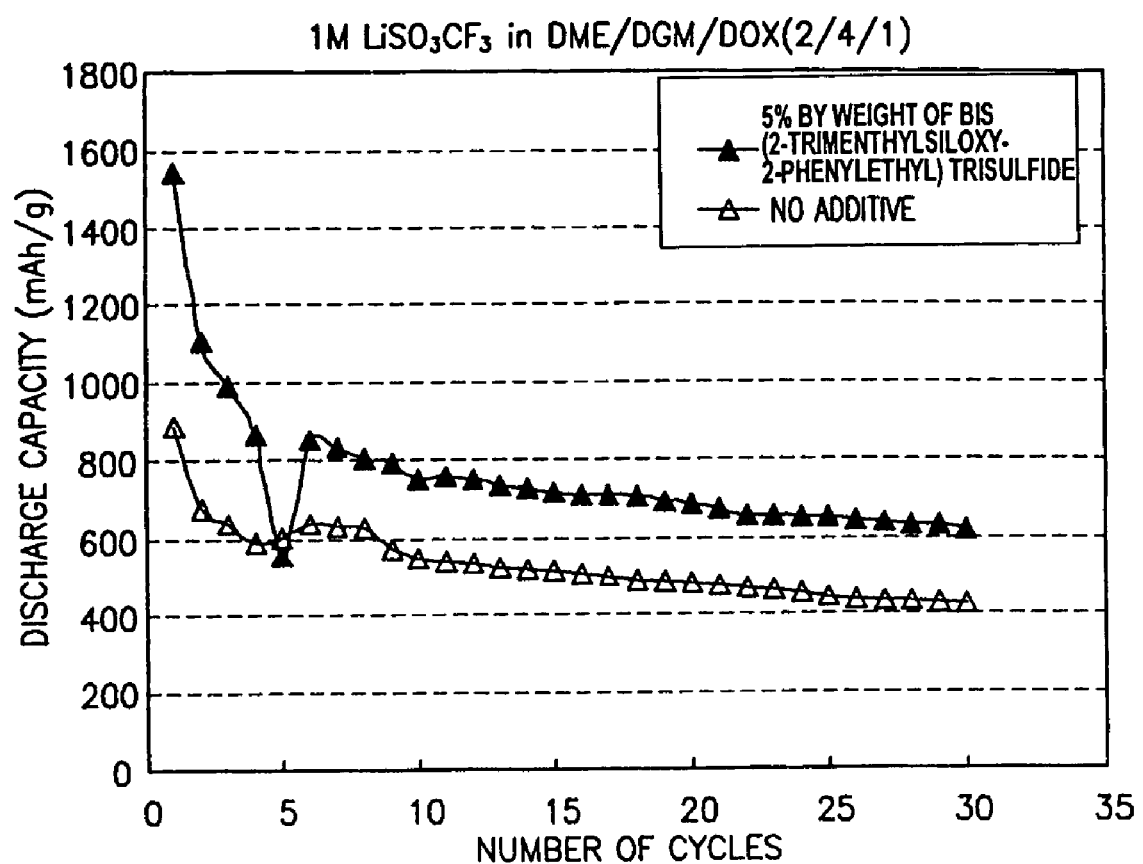
FIG. 3 is a graph illustrating the discharge capacity according to cycles for the lithium-sulfur batteries according to Examples and Comparative Examples.

A lithium-sulfur battery was assembled according to the same method as in Example 1, except that the organic electrolytic solution contains 5.0% by weight of bis(2-trimethylsiloxy-2-phenylethyl) trisulfide and 1M LiSO$_3$CF$_3$ in DME/DGM/DOX (2:4:1 by volume). The charge-discharge test was performed using the obtained battery. The results are shown in FIG. 3.

Comparative Example 1

A lithium-sulfur battery was assembled according to the same composition and method as in Example 1, except that bis(2-trimethylsiloxy-2-phenylethyl) trisulfide was not added to the electrolytic solution. The charge-discharge test was performed using the obtained battery. The results are shown in FIGS. 1 and 2.

Comparative Example 2

A lithium-sulfur battery was assembled according to the same composition and method as in Example 2, except that bis(2-trimethylsiloxy-2-phenylethyl) trisulfide was not added to the electrolytic solution. The charge-discharge test as performed using the obtained battery. The results are shown in FIG. 3.

Charge-Discharge Test

Ordinary skill in the art that various changes in form and details may be made therein without departing from the spirit and scope of the present invention as defined by the following claims. A charge-discharge test was performed on the lithium-sulfur batteries prepared in the examples and the comparative examples.

The charge-discharge test was performed by discharging each of the batteries to 1.2 mA/cm$^2$ of a discharge current density, and carrying out by one cycle varying discharge current to 1.2, 2.4, 6 and 12 mA at a fixed charge current density of 2.4 mA/cm$^2$, and then carrying out 100 cycles of charge-discharge at a fixed discharge current density of 6 mA/cm$^2$. The cut-off voltage on the charge-discharge was 1.5 to 2.8 V.

FIG. 1 is a charge-discharge curve when the organic electrolytic solutions in which bis(2-trimethylsiloxy-2-phenylethyl) trisulfide is added and not added, respectively, are applied to the lithium-sulfur secondary batteries. FIGS. 2 and 3 are graphs illustrating discharge capacity according to number of cycles when the organic electrolytic solutions in which bis(2-trimethylsiloxy-2-phenylethyl) trisulfide is added and not added, respectively, are applied to the lithium-sulfur secondary batteries.

As can be seen in FIGS. 2 and 3, when the organic electrolytic solution in which bis(2-trimethylsiloxy-2-phenylethyl) trisulfide is added is applied, the lithium-sulfur secondary battery has a higher discharge capacity at 0.2 cycle and a longer lifetime at 30 cycles.

When the compound of Formula (I) according to the present invention is added to an existing electrolytic solution for a lithium-sulfur secondary battery, the cycle lifetime of batteries can be improved and the electrolytic solution according to the present invention is more effective since the compound does not react readily with lithium metal unlike Li$_2$S dissociating material previously reported.

While the present invention has been particularly shown and described with reference to exemplary embodiments thereof, it will be understood by those of.

What is claimed is:
1. An electrolytic solution for a lithium-sulfur battery, comprising:
a lithium salt;
an organic solvent; and
a compound represented by Formula (I):

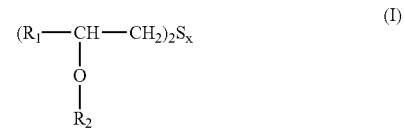

wherein R$_1$ is selected from the group consisting of a hydrogen atom, a substituted or unsubstituted C1-C30 alkyl group, a substituted or unsubstituted C1-C30 alkoxy group, a substituted or unsubstituted C6-C30 aryl group, and a substituted or unsubstituted C8-C30 aralkenyl group;

$R_2$ represents a group of Formula II or III;

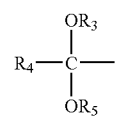
(II)

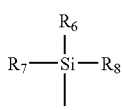
(III)

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group; and X is an integer of 2 to 5.

2. The electrolytic solution of claim 1, wherein an amount of the compound of Formula (I) is 0.1 to 20% by weight based on the weight of the electrolytic solution.

3. The electrolytic solution of claim 1, wherein an amount of the compound of Formula (I) is 0.1 to 5% by weight based on the weight of the electrolytic solution.

4. The electrolytic solution of claim 1, wherein the compound of Formula (I) is bis(2-trimethylsiloxy-2-phenylethyl) trisulfide.

5. The electrolytic solution of claim 1, wherein $R_1$ of Formula (I) is selected from the group consisting of a substituted or unsubstituted C1-C12 alkyl group, a substituted or unsubstituted C6-C18 aryl group, a substituted or unsubstituted C1-C12 alkoxy group, and a substituted or unsubstituted C8-C18 aralkenyl group.

6. The electrolytic solution of claim 1, wherein $R_1$ of Formula (I) is selected from the group consisting of a substituted or unsubstituted C1-C6 alkyl group, a substituted or unsubstituted C6-C12 aryl group, a substituted or unsubstituted C1-C6 alkoxy group, and a substituted or unsubstituted C8-C12 aralkenyl group.

7. The electrolytic solution of claim 1, further comprising an electron conducting material.

8. The electrolytic solution of claim 7, wherein the electron conducting material is selected from the group consisting of a carbon black, a graphite, a carbon fiber, an electron conducting compound having at least one of a conjugate carbon-carbon double bond and a carbon-nitrogen double bond, and mixtures thereof.

9. The lithium-sulfur battery comprising a cathode, an anode, a separator interposed between said cathode and said anode, and the electrolytic solution of claim 1.

10. The electrolytic solution of claim 1, wherein $R_2$ represents a group of Formula II.

11. The electrolytic solution of claim 1, wherein $R_2$ represents a group of Formula III.

12. A lithium-sulfur battery, comprising
an anode including at least one anode active material;
a cathode including at least one cathode active material;
a separator interposed between the cathode and the anode to separate from each other; and
an organic electrolytic solution comprising a lithium salt, an organic solvent and a compound represented by Formula (I):

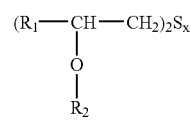
(I)

wherein $R_1$ is selected from the group consisting of a hydrogen atom, a substituted or unsubstituted C1-C30 alkyl group, a substituted or unsubstituted C1-C30 alkoxy group, a substituted or unsubstituted C6-C30 aryl group, and a substituted or unsubstituted C8-C30 aralkenyl group;

$R_2$ represents a group of Formula II or III;

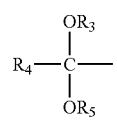
(II)

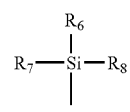
(III)

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group; and X is an integer of 2 to 5.

13. The lithium-sulfur battery of claim 12, wherein 0.1 to 20% by weight of the compound of said Formula (I) is included based on the weight of the electrolytic solution.

14. The lithium-sulfur battery of claim 12, wherein the compound of said Formula (I) is bis(2-trimethylsiloxy-2-phenylethyl) trisulfide.

15. The lithium-sulfur battery of claim 12, wherein the anode active material is at least one active material selected from the group consisting of elemental sulfur, $Li_2S_n$, in which $n \geq 1$, a catholyte in which $Li_2S_n$, where $n \geq 1$, is dissolved, an organosulfur compound, and a carbon-sulfur polymer $((C_2S_x)_n)$ where x=2.5 to 50, and $n \geq 2$.

16. The lithium-sulfur battery of claim 12, wherein the cathode active material is selected from the group consisting of a lithium metal, a lithium alloy and a composite of lithium/inert sulfur.

17. The lithium-sulfur battery of claim 12, wherein the lithium salt is selected from the group consisting of $LiPF_6$, $LiSO_3CF_3$, $LiN(SO_2CF_3)_2$, $LiClO_4$, $LiBF_4$, $LiAsF_6$, $LiC(CF_3SO_2)_3$, $LiN(C_2F_5SO_2)_2$, $LiN(CR_3SO_2)_2$ and a combination thereof.

18. The lithium-sulfur battery of claim 12, wherein the organic solvent is selected from the group consisting of an oligoether-based compound, an ester carbonate-based compound, an alkyl ester-based compound, an aromatic nitrile-based compound, an amide-based compound, a lactone-based compound, a sulfur-based compound, and a combination thereof.

19. The lithium-sulfur battery of claim 18, wherein the organic solvent is selected from the group consisting of tetrahydrofuran, 2-methyl tetrahydrofuran, 1,3-dioxolane, 4-methyl-1,3-dioxolane, dimethyl carbonate, diethyl carbonate, dipropyl carbonate, methylethyl carbonate, methylpropyl carbonate, methyl formate, methyl acetate, methyl propionate, butyl lactone, and a combination thereof.

20. The lithium-sulfur battery of claim 12, wherein the organic electrolytic solution further comprises an electron conducting material.

21. The lithium-sulfur battery of claim 20, wherein the electron conducting material is selected from the group consisting of a carbon black, a graphite, a carbon fiber, an electron conducting compound having at least one of a conjugate carbon-carbon double bond and a carbon-nitrogen double bond, and mixtures thereof.

22. A lithium-sulfur battery, comprising:
an anode comprising at least one anode active material selected from the group consisting of elemental sulfur, $Li_2S_n$ where $n \geq 1$, a catholyte in which $Li_2S_n$, where $n \geq 1$, is dissolved, an organosulfur compound, a carbon-sulfur polymer represented by Formula $(C_2S_x)_n$ where x=2.5 to 50 and $n \geq 2$, a sulfur-based compound, and a combination thereof;
a cathode comprising at least one cathode active material selected from the group consisting of a lithium metal, a lithium alloy and a composite of lithium/inert sulfur;
a separator interposed between the cathode and the anode to separate from each other; and
an electrolytic solution comprising:
a lithium salt;
an organic solvent;
a compound represented by Formula (I) in a percentage by weight from 0.1 to 20% based on the weight of the electrolyte solution:

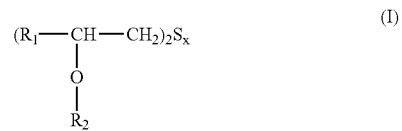

wherein $R_1$ is selected from the group consisting of a hydrogen atom, a substituted or unsubstituted C1-C30 alkyl group, a substituted or unsubstituted C1-C30 alkoxy group, a substituted or unsubstituted C6-C30 aryl group, and a substituted or unsubstituted C8-C30 aralkenyl group;
$R_2$ represents a group of Formula II or III;

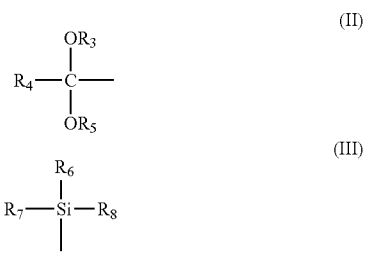

wherein $R_3$, $R_4$, $R_5$, $R_6$, $R_7$ and $R_8$ are independently a hydrogen atom, a C1-C5 linear or branched alkyl group, or a C1-C5 linear or branched alkoxy group;
X is an integer of 2 to 5; and
optionally an electron conducting material.

* * * * *